United States Patent
Chanda et al.

(10) Patent No.: US 10,250,553 B2
(45) Date of Patent: Apr. 2, 2019

(54) ARP OFFLOADING FOR MANAGED HARDWARE FORWARDING ELEMENTS

(71) Applicant: Nicira, Inc., Palo Alto, CA (US)

(72) Inventors: Anupam Chanda, San Jose, CA (US); Pankaj Thakkar, Cupertino, CA (US)

(73) Assignee: NICIRA, Inc., Palo Alto, CA (US)

( * ) Notice: Subject to any disclaimer, the term of this patent is extended or adjusted under 35 U.S.C. 154(b) by 276 days.

(21) Appl. No.: 15/342,921

(22) Filed: Nov. 3, 2016

(65) Prior Publication Data

US 2017/0126615 A1 May 4, 2017

Related U.S. Application Data

(60) Provisional application No. 62/250,487, filed on Nov. 3, 2015.

(51) Int. Cl.
*H04L 29/12* (2006.01)

(52) U.S. Cl.
CPC ................... *H04L 61/103* (2013.01)

(58) Field of Classification Search
CPC ........ H04L 61/103; H04L 49/70; H04L 45/66
See application file for complete search history.

(56) References Cited

U.S. PATENT DOCUMENTS

| | | | |
|---|---|---|---|
| 5,526,484 A | 6/1996 | Casper et al. | |
| 5,751,967 A | 5/1998 | Raab et al. | |
| 6,243,394 B1 | 6/2001 | Deng | |
| 6,640,251 B1 | 10/2003 | Wiget et al. | |
| 6,850,529 B1 | 2/2005 | Wong | |
| 7,463,639 B1 | 12/2008 | Rekhter | |
| 7,933,198 B1 | 4/2011 | Pan | |
| 7,937,438 B1 | 5/2011 | Miller et al. | |
| 8,046,456 B1 | 10/2011 | Miller et al. | |
| 8,161,095 B2 | 4/2012 | Manion et al. | |
| 8,345,688 B2 | 1/2013 | Zhou et al. | |
| 8,386,642 B2 | 2/2013 | Elzur | |
| 8,589,919 B2 | 11/2013 | Smith et al. | |
| 8,874,876 B2 | 10/2014 | Bhadra et al. | |
| 8,897,134 B2 | 11/2014 | Kern et al. | |

(Continued)

FOREIGN PATENT DOCUMENTS

| EP | 1154601 A1 | 11/2001 |
|---|---|---|
| EP | 1653688 A1 | 5/2006 |

(Continued)

OTHER PUBLICATIONS

Graubner, Pablo, et al., "Cloud Computing: Energy-Efficient Virtual Machine Consolidation," IT Professional, Mar. 2013, 7 pages, vol. 15, Issue 2, IEEE.

(Continued)

*Primary Examiner* — Siming Liu
(74) *Attorney, Agent, or Firm* — Adeli LLP

(57) ABSTRACT

Some embodiments provide an ARP-offload service node for several managed hardware forwarding elements (MHFEs) in a datacenter in order to offload ARP query processing by the MHFEs. The MHFEs are managed elements because one or more network controllers (e.g., one or more management servers) send configuration data to the MHFEs to configure their operations. In some of these embodiments, the network controllers configure the MHFEs to create logical forwarding elements (e.g., logical switches, logical routers, etc.) each of which can span two or more managed forwarding elements.

18 Claims, 6 Drawing Sheets

(56) References Cited

U.S. PATENT DOCUMENTS

| | | |
|---|---|---|
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,306,843 B2 | 4/2016 | Koponen et al. |
| 9,319,375 B2 | 4/2016 | Gross, IV et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0267866 A1 | 12/2004 | Carollo et al. |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2008/0189769 A1 | 8/2008 | Casado et al. |
| 2008/0215586 A1 | 9/2008 | Pruet |
| 2009/0006603 A1 | 1/2009 | Duponchel et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Hao et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0147898 A1 | 6/2012 | Koponen et al. |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1 | 2/2013 | Koponen et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2014/0029451 A1 | 1/2014 | Nguyen |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0269709 A1 | 9/2014 | Benny et al. |
| 2014/0301391 A1 | 10/2014 | Krishnan et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1 | 4/2015 | Davie et al. |
| 2015/0124586 A1 | 5/2015 | Pani |
| 2015/0124809 A1 | 5/2015 | Edsall et al. |
| 2015/0124821 A1 | 5/2015 | Chu et al. |
| 2015/0215189 A1 | 7/2015 | Lim |
| 2015/0281075 A1 | 10/2015 | Park et al. |
| 2015/0326425 A1 | 11/2015 | Natarajan et al. |
| 2015/0372906 A1 | 12/2015 | Tirat |
| 2015/0379150 A1 | 12/2015 | Duda |
| 2016/0014073 A1 | 1/2016 | Reddy et al. |
| 2016/0173535 A1 | 6/2016 | Barabash et al. |
| 2016/0197824 A1 | 7/2016 | Lin et al. |
| 2016/0212222 A1 | 7/2016 | Bultema et al. |
| 2016/0232019 A1 | 8/2016 | Shah et al. |
| 2016/0308690 A1 | 10/2016 | Chanda et al. |
| 2016/0380812 A1 | 12/2016 | Chanda et al. |
| 2017/0034002 A1 | 2/2017 | Sinn |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093617 A1 | 3/2017 | Chanda et al. |
| 2017/0093618 A1 | 3/2017 | Chanda et al. |
| 2017/0093636 A1 | 3/2017 | Chanda et al. |
| 2017/0093646 A1 | 3/2017 | Chanda et al. |
| 2017/0093686 A1 | 3/2017 | Uttaro et al. |
| 2017/0093758 A1 | 3/2017 | Chanda |
| 2017/0171055 A1 | 6/2017 | Wang et al. |
| 2017/0171077 A1 | 6/2017 | Chanda |
| 2017/0171078 A1 | 6/2017 | Chanda |
| 2017/0171113 A1 | 6/2017 | Chanda |
| 2017/0208097 A1 | 7/2017 | Kirby et al. |
| 2017/0317928 A1 | 11/2017 | Gude et al. |
| 2017/0366446 A1 | 12/2017 | Davie et al. |
| 2018/0007004 A1 | 1/2018 | Basler |
| 2018/0007005 A1 | 1/2018 | Chanda et al. |
| 2018/0026895 A1 | 1/2018 | Wang et al. |

FOREIGN PATENT DOCUMENTS

| | | |
|---|---|---|
| JP | 2003069609 | 3/2003 |
| WO | 2005112390 A1 | 11/2005 |
| WO | 2008095010 A1 | 8/2008 |

OTHER PUBLICATIONS

Pfaff, Ben, et al., "The Open vSwitch Database Management Protocol," draft-pfaff-ovsdb-proto-00, Aug. 20, 2012, 34 pages, available at http:tools.ietf.orghtmldraft-pfaff-ovsdb-proto-00.

ARP OFFLOADING FOR MANAGED HARDWARE FORWARDING ELEMENTS

BACKGROUND

Some protocols utilize broadcast to perform their functionalities. Examples of such protocols include the address resolution protocol (ARP) and dynamic host configuration protocol (DHCP). Broadcast traffic is sent to all hosts within a broadcast domain. Accordingly, a broadcast packet usually consumes much more resources than a unicast packet. Previous researches have pointed out that broadcast traffic causes issues like scalability and security. For example, in a network with about a few thousand hosts, studies have shown that a host can receive a thousand ARP request per second. The amount of broadcast traffic roughly increases linearly with the number of hosts. Thus, when the host number becomes large, the ARP traffic becomes prohibitively high.

These issues also exist in virtual networks, such as virtual layer 2 networks based on VXLAN or NVGRE. These protocols use headers higher than layer 3 to encapsulate packets and can cross layer 3 boundaries, so a virtual network can be created across multiple subnets. A broadcast packet in such a virtual network needs to be sent to all nodes located in different subnets, using layer 3 multicast protocols (e.g., PIM) or unicasts to all hosts.

When the layer 3 multicast is used, the routers need to maintain the state of a multicast group for each virtual network. When the number of multicast groups is large (e.g. VXLAN supports $2^{16}$ virtual networks), the routers' workload could be very high. A mitigating approach is to share a multicast group among multiple virtual networks, but this approach leads to receipts of unrelated packets and therefore deteriorates performance. Besides, many customers are reluctant to enable multicast in their physical network.

If the unicast approach is used, a host needs to send one copy of a broadcast packet to each host that the virtual network spans, or each VM in a virtual network. For a large virtual layer 2 network, this will consume a lot of resources, including computation resources at the source entity and bandwidth resources at the physical network.

Besides, both multicast and unicast approaches consume not only network resources within a subnet, but also routers among subnets. Accordingly, compared with attacks on a physical layer 2 network, a successful DoS (Denial of Service) attack that floods ARP packets to a virtual layer 2 network can have a large impact.

BRIEF SUMMARY

Some embodiments provide an ARP-offload service node for several managed hardware forwarding elements (MHFEs) in a datacenter in order to offload ARP query processing by the MHFEs. In some embodiments, the MHFEs are hardware VTEPs (VXLAN tunnel end points, where VXLAN stands for virtual extensible local area network), such as top of rack (TOR) switches. The MHFEs are managed elements because one or more network controllers (e.g., one or more management servers) send configuration data to the MHFEs to configure their operations. In some of these embodiments, the network controllers configure the MHFEs to create logical forwarding elements (e.g., logical switches, logical routers, etc.) each of which can span two or more managed forwarding elements (e.g., MHFEs or software forwarding elements executing on host computers that connect to the MHFEs and that execute multiple compute nodes, such as virtual machines, containers, etc.).

Instead of just one ARP-offload service node, some embodiments use a cluster of such service nodes for load balancing and high availability (HA) purposes. Specifically, in such a cluster, the nodes in the cluster can share the ARP offload workload, and if one of them crashes, other nodes in the cluster can pick its workload.

In some embodiments, a network controller pushes to the ARP offload cluster the IP-to-MAC mapping for various ports of the various logical switches. A MHFE can then send an ARP query to one of the service nodes in the ARP offload cluster. The node examines its local data storage (e.g., its ARP table), and responds with the result to the MHFE. This approach frees up the MHFE or service node from having to replicate the ARP query for the network elements along which the logical switch spans.

In some embodiments, a given ARP-offload service node may not have the IP-to-MAC mapping for a given target IP (e.g., the mapping might not be known by a network controller that provides the mapping records to the service node). In this case, the ARP-offload service node replicates the ARP query for the span of the logical switch. This involves sending an ARP query to each host that execute a software switch that implements the logical switch. When forwarding the ARP query to a host, the ARP-offload service node encodes its transport label in the overlay context bits. This allows the host to send back the ARP response as a unicast message back to the ARP-offload service node. The ARP-offload service node then forwards the response back to the original requesting MHFE.

For other MHFEs in the span of the logical switch, the ARP-offload service node forwards the ARP query as is over an overlay tunnel (e.g., a VXLAN tunnel). If the target IP is attached to one of them, the response would be sent back directly to the original requester MHFE. When the ARP request is from a logical router port (e.g., when the MHFE that sent the ARP request is a logical router), the ARP-offload service node in some embodiments performs some additional operations before forwarding the ARP query to other MHFEs. Before it forwards the packet to other MHFEs, the service node uses source IP of 0.0.0.0 and a unique MAC (e.g., a physical MAC, or PMAC) identifying the source (i.e., the ARP-offload service node) in the ARP query. This converts the ARP query to a probe. When the target IP is attached to one of these other MHFEs, the MHFE sends back the ARP reply to the ARP-offload service node because the controller would have set up the forwarding table of this MHFE with an entry for PMAC pointing to the tunnel IP of the ARP-offload service node.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
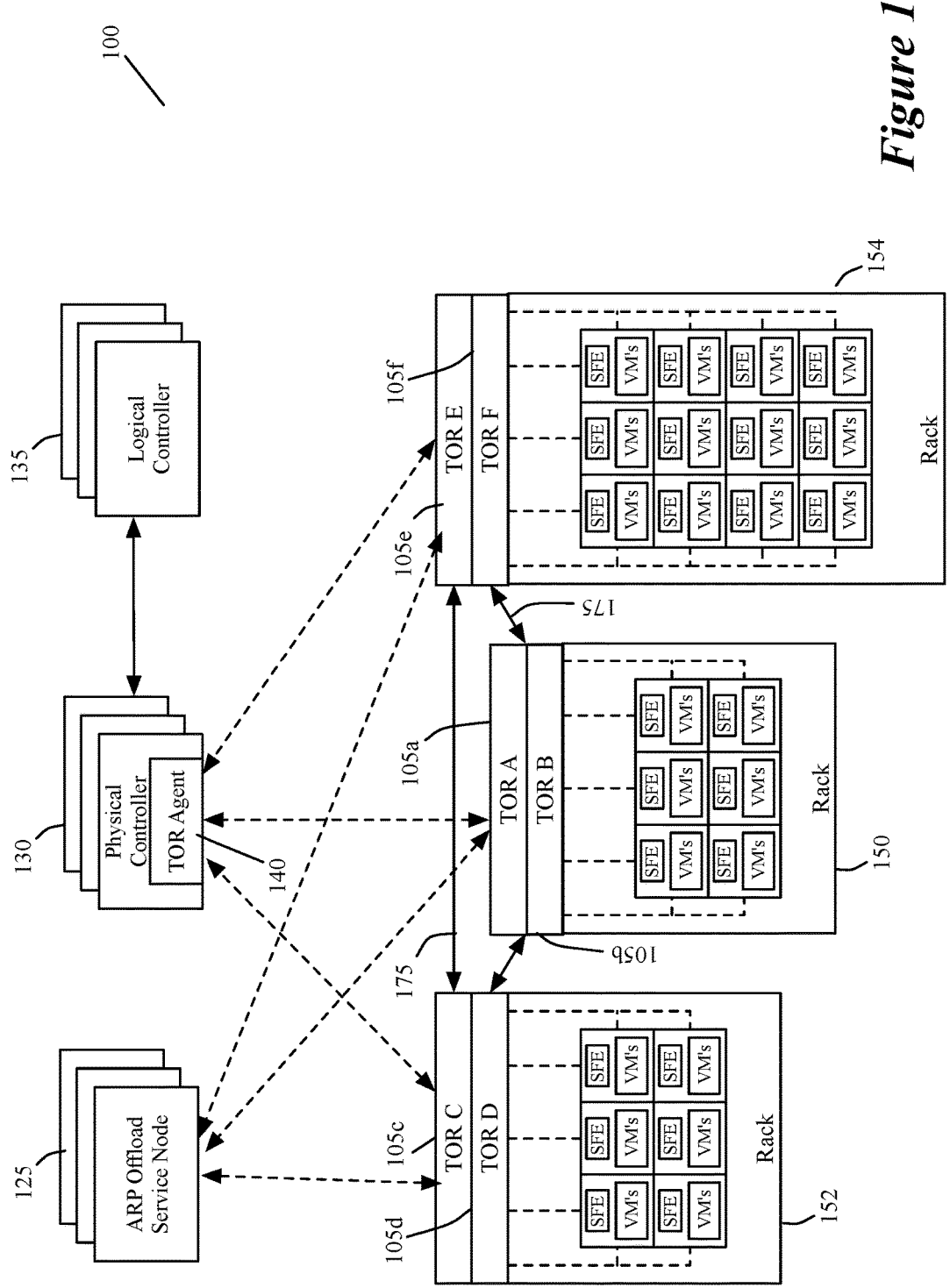
FIG. 1 illustrates a system that utilize ARP offload service nodes of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide an ARP-offload service node for several managed hardware forwarding elements (MHFEs) to use in a datacenter in order to offload ARP query processing by the MHFEs. In some embodiments, the MHFEs are hardware VTEPs (VXLAN tunnel end points, where VXLAN stands for virtual extensible local area network), such as top of rack (TOR) switches. The MHFEs are managed elements because one or more network controllers (e.g., one or more management servers) send configuration data to the MHFEs to configure their operations. In some of these embodiments, the network controllers configure the MHFEs to create logical forwarding elements (LFEs) that each can span two or more managed forwarding elements (e.g., MHFEs or software forwarding elements executing on host computers that connect to the MHFEs and that execute multiple compute nodes, such as virtual machines, containers, etc.).

Instead of just one ARP-offload service node, some embodiments use a cluster of such service nodes for load balancing and high availability (HA) purposes. Specifically, in such a cluster, the nodes in the cluster can share the ARP offload workload, and if one of them crashes, other nodes in the cluster can pick its workload.

In some embodiments, a network controller pushes to the ARP offload cluster the IP-to-MAC mapping for various ports of the various logical switches. A MHFE can then send an ARP query to one of the service nodes in the ARP offload cluster. The node examines its local data storage (e.g., its ARP table), and responds with the result to the MHFE. This approach frees up the MHFE or service node from having to replicate the ARP query for the network elements along which the logical switch spans.

In some embodiments, a given ARP-offload service node may not have the IP-to-MAC mapping for a given target IP (e.g., the mapping might not be known by a network controller that provides the mapping records to the service node). In this case, the ARP-offload service node replicates the ARP query for the span of the logical switch. This involves sending an ARP query to each host that execute a software switch that implements the logical switch. When forwarding the ARP query to a host, the ARP-offload service node encodes its transport label in the overlay context bits. This enables the ARP response (unicast) to be relayed back to this ARP-offload service node. The ARP-offload service node then forwards the response back to the original requesting MHFE.

For other MHFE in the span of the logical switch, the ARP-offload service node forwards the ARP query as is over an overlay tunnel (e.g., a VXLAN tunnel). If the target IP is attached to one of them, the response would be sent back directly to the original requester MHFE. When the ARP request is from a logical router port, the ARP-offload service node performs some additional operations in some embodiments. Before it can forward the packet to other MHFEs, the service node uses source IP of 0.0.0.0 and a unique MAC (e.g., a physical MAC, or PMAC) that identifies the ARP-offload service node itself as the source of the ARP query. This converts the ARP query to a probe. The response would be sent back to the ARP-offload service node from the MHFE that has the machine with the target IP attached. This is because a network controller would have set up the forwarding table of the MHFE with an entry for PMAC pointing to the tunnel IP of the ARP-offload service node that sent the ARP query.

FIG. 1 illustrates a system 100 that utilizes ARP offload service nodes 125 of some embodiments. In this system, the MHFEs for which the ARP offload service nodes perform the ARP message processing are TOR switches (i.e., TORs). In some embodiments, the different service nodes are software modules that execute on different computers. In some of these embodiments, the service nodes can execute on host computers along with data compute nodes, such as virtual machines or containers, while in other embodiments, the service nodes can only execute on their own standalone computers or on computers with other controllers.

As shown, the TORs connect software forwarding elements (SFEs) executing on hosts in one rack to SFEs executing on hosts on other racks. In this figure, three racks 150, 152, and 154 are shown. Each rack includes two TORs 105 and several hosts 110, with each host executing one or more virtual machines (VMs) and at least one SFE (e.g., a software switch and/or router). As further shown, the system 100 also includes a cluster of physical controllers 130 and a cluster of logical controllers 135, which will be further described below.

In some embodiments, the racks 150-154 operate in one or more data centers that include other racks (not shown) with other TORs, other hosts and other VMs and SFEs. In some of these embodiments, the SFEs on these other racks are configured to form multiple logical forwarding elements (e.g., logical switches and/or logical routers) with the TORs 105 of racks 150-154. Examples of such other racks will be further described below by reference to FIG. 5. As discussed by reference to FIG. 5, the racks 150-154 in some embodiments contain private network servers, VMs and hosts, while the other racks contain public network VMs and hosts.

Each LFE is an abstract construct that conceptually spans multiple SFEs and TORs to connect VMs on multiple different hosts to each other. In some embodiments, overlay tunnel connections between the hosts and TORs facilitate the creation of the LFEs. To facilitate the overlay connections between hosts in different racks, some embodiments define tunnel connections between different pairs of TORs in different racks. FIG. 1 illustrates several tunnels 175 between TORs. In some embodiments, four tunnels are created in this example between each TOR in each rack's pair of TORs and each TOR in another rack's pair of TORs. For instance, between racks 150 and 152, one tunnel is created between TORs 105a and 105c, one tunnel is created between TORs 105a and 105d, one tunnel is created between TORs 105b and 105c, and one tunnel is created between TORs 105b and 105d.

Different types of tunnels can be used in different embodiments. Examples of such tunnels include STT (stateless transport tunnels), GRE (Generic Routing Encapsulation) tunnels, VXLAN tunnels, Geneve tunnels, etc. Tunnels can often be viewed as point-to-point logical wire connections between their endpoints (e.g., between a pair of TORs) because packets inside the tunnel headers are transparent to the intervening network fabric (e.g., intervening switches, routers, etc.).

In some embodiments, each TOR can serve as the master TOR for one set of VMs in a logical network. Also, in some embodiments, each TOR can be master TOR for multiple different sets of VMs for multiple different logical networks. In some embodiments, each TOR can also serve as a slave TOR for one or more other sets of VMs in one or more logical networks.

The logical controllers generate data to define the logical forwarding elements, while the physical controllers distribute the generated data to the TORs and SFEs. The number of logical controllers can be different than the number of logical networks as one logical controller can generate data for multiple logical networks. The generated data is used to configure the SFEs and TORs to implement the logical forwarding elements. In some embodiments, the generated data is transformed into physical data by the physical controllers 130, local controllers (not shown) executing on the hosts, and/or by modules operating on the TORs, before this data is supplied to forwarding plane of the SFEs and/or TORs. For instance, before distributing the data generated by the logical controller, a physical controller in some embodiments converts the data into another format, e.g., into (1) physical control plane data for the TORs and/or SFEs, or (2) into a format that a TOR module or host local controller can further process to produce physical control plane data.

The number of physical controllers can be different than the number of TORs as one physical controller typically distributes data to multiple TORs. Also, in some embodiments, only one physical controller is the master controller for supplying data to a set of TORs to configure the TORs to facilitate the creation of LFEs. At any given time, only the master physical controller can provide data to its TORs. In some embodiments, each TOR's master physical controller can have another physical controller that operates as a slave physical controller that serves as a backup (e.g., a hot standby backup) to the master physical controller in case the master controller fails.

In some embodiments, one controller can operate as both a logical controller and a physical controller. Each controller in some embodiments is a separate software process, and one computing device can execute two controller processes, where one controller process is a logical controller and another controller process is a physical controller. To communicate with its TORs, each physical controller has a TOR agent 140 to communicate with the TORs for which the physical controller is the master controller (i.e., the primary controller for communicating with the TORs). In some embodiments, the TORs and TOR agents communicate with each other by using the OVSdb communication protocol.

As mentioned above, each TOR can be master and/or slave TOR for multiple different sets VMs for multiple different logical networks. To ensure proper routing of data packets to the VMs, each TOR sends to its master physical controller an inventory (e.g., a table, a list, etc.) of the set of VMs for which the TOR serves as the master TOR and the set of VMs for which it serves as the slave TOR. For each logical network, the physical controllers pass along the inventory data to the logical controller that manages the logical network, so that the logical controller can reconcile the various reported master/slave inventories and distribute to the TORs (through the physical controllers) a master inventory that identifies the correct master/slave TOR for each VM in a logical network. This reconciliation is useful avoid misroutings that can occur when two TORs are reported as a master TOR for a VM (e.g., during a failover condition when the failed and new TOR are being reported as the master TOR for the VM).

In some embodiments, the controllers (e.g., the logical and physical controllers) communicate through RPC (remote procedure call) channels. Also, in some embodiments, the inventories that are exchanged between the TORs and the physical controllers, and between the physical and logical controllers, specifies the logical network or LFE associated with each compute end node (e.g., each MAC (media access control) address) reported in the inventory. The logical network or LFE identify is useful in that it allows the parsing of the records in a received inventory into different inventories for different inventories for different logical or physical controllers or different TORs.

In some embodiments, the logical controllers pass IP-to-MAC bindings to hosts and to the ARP offload service nodes 125. In some embodiments, the logical controllers also pass the IP-to-MAC bindings to some but not all of the TORs, because not all of the TORs can process ARP queries and hence do not have use for such bindings. In other embodiments, the logical controllers do not pass these bindings to any of the TORs.

In some embodiments, the logical controllers pass the IP-to-MAC bindings to the hosts and TORs through their respective physical controllers. In some embodiments, the logical controllers also pass the IP-to-MAC bindings to the service nodes through one or more physical controllers that serve as master physical controllers for the service nodes. In other embodiments, the logical controllers directly pass the bindings to the service nodes without going through the physical controllers.

In some embodiments, the logical controllers also configure the TORs that do not receive the IP-to-MAC bindings, with data that directs them to offload multicast, broadcast and unknown packets (referred to below as BUM packets for broadcast, unknown and multicast packet) to service nodes. In some embodiments, a TOR has two remote MAC tables, called Ucast_Macs_Remote and Mcast_Macs_Remote, which are respectively for specifying the next destination of (1) a unicast packet with a unique destination MAC address, and (2) a broadcast, multicast, or unknown unicast packet that does not have a unique destination MAC address. In some embodiments, each of these tables is a tunnel endpoint locator table, as the TOR connects through a tunnel to a destination that is identified in the table.

To configure the TORs to offload BUM packets to service nodes, the logical controller in some embodiments generates data for the Mcast_Macs_Remote table. This data directs a TOR to direct BUM packets to one service node, or to a set of service nodes. In some embodiments, this data provides the TOR with a set of load balancing criteria for selecting different service nodes for different BUM packets. In other embodiments, the TOR uses its own load balancing criteria to distribute the BUM packets amongst the service nodes in a set of service nodes.

In some embodiments, a logical controller also configures the hosts to respond in unicast to the service nodes in response to an ARP query that the service nodes send to them with their transport labels in the context bits that are encoded in the overlay tunnel headers. Also, in some embodiments, a logical controller also configures a first TOR to reply to an ARP query from a service node to a requesting second TOR when the target IP is attached to the first TOR. As mentioned above, the service node provides to ARP query to the first TOR over a VXLAN tunnel in some embodiments.

The logical controller also configures the first TOR to have a different response when the ARP request is from a logical router port. In this case, with the ARP query, the service node uses source IP of 0.0.0.0 and a unique MAC (e.g., a physical MAC, or PMAC) that identifies the ARP-offload service node itself as the source of the ARP query. As mentioned above, the logical controller would configure the first TOR to treat any such ARP query as a probe that should be responded to by sending back the MAC address of the attached target IP to the service node. In some embodiments, this configuration would set up a TOR forwarding table with an entry for PMAC pointing to the tunnel IP of the service node that sent the ARP query. The logical controller forwards configuration data (e.g., the BUM-packet configuration data) to a TOR in some embodiments through the physical controller of the TOR. In some embodiments, this physical controller and/or a process on the TOR convert this configuration into a different format before storing this data in a TOR table (e.g., in the Mcast_Macs_Remote table that specifies how the BUM packets should be processed).

Figure 2:
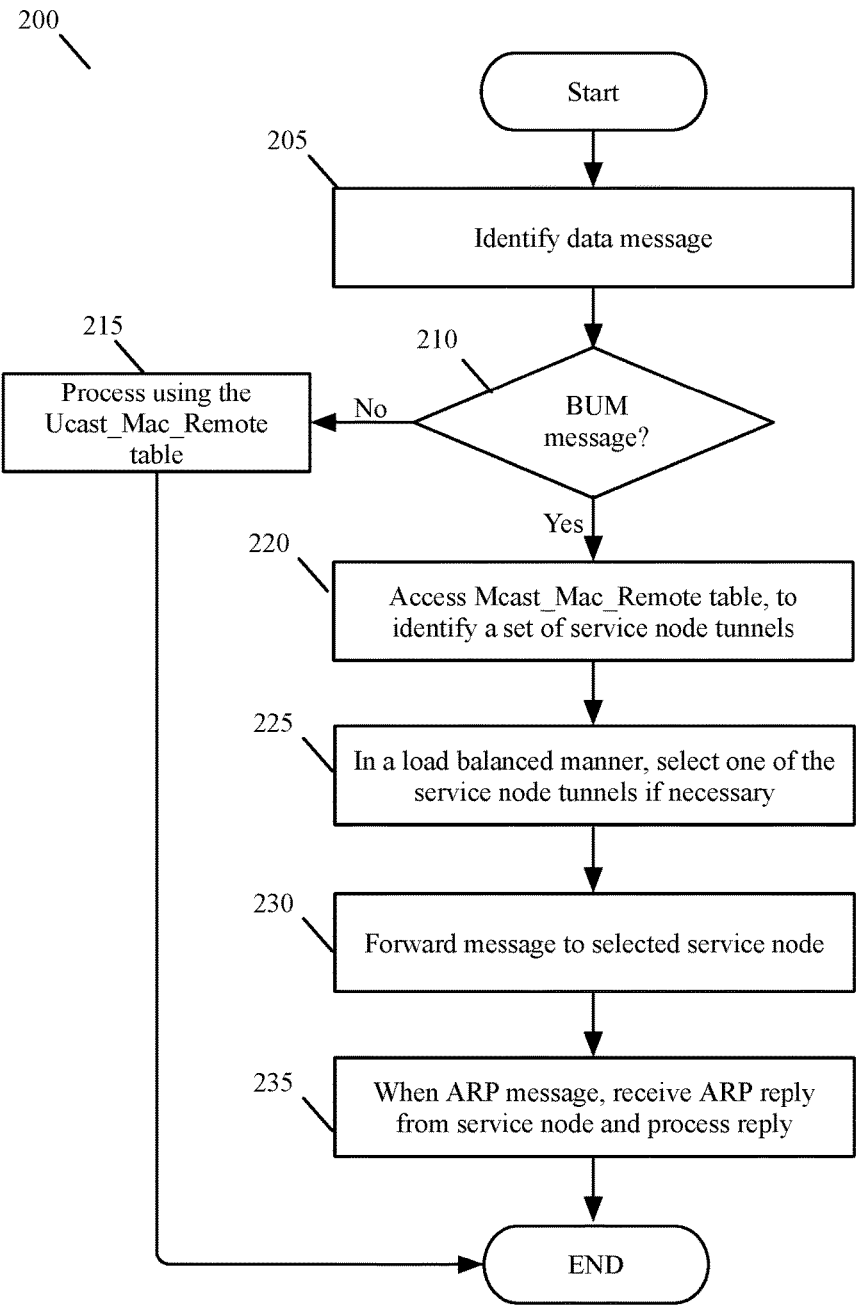
FIG. 2 illustrates a process that a TOR performs in the system to process a BUM message, a broadcast, unknown, or multicast message.

FIG. 2 illustrates a process 200 that a TOR performs in the system 100 to process a BUM message, a broadcast, unknown, or multicast message. This process starts (at 205) each time the TOR 105 has to process a data message (e.g., from one of the VMs on a host in its rack 150, 152, or 154, or from a logical router port implemented by a TOR 105). The process 200 then determines (at 210) whether this message is a BUM message by examining a header value in the message that specifies whether this message is a unicast message or BUM message. When the message is not a BUM message (i.e., it is a unicast message), the process uses (at 215) the Ucast_Macs_Remote table to identify the tunnel to use to forward the message to its destination. This tunnel might connect to the data message's destination, or it might connect to an intervening forwarding element behind which the destination node resides. After 215, the process ends.

When process determines (at 210) that the message is a BUM message, the process accesses (at 220) its Mcast_Mac_Remote table to identify a set of tunnels to a set of service nodes to process the BUM message. In some embodiments, the identified set of service node tunnels can include only one service node tunnel, while in other embodiments, the identified set of service node tunnels can include more than one service node tunnel.

When the set of service node tunnels includes more than on service node tunnel, the process selects (at 225) one of the service node tunnels in a load balanced manner. In the Mcast_Mac_Remote table includes in some embodiments the load balancing criteria (e.g., weighting values) for the process to select the service node tunnel in a load balanced manner (e.g., in a weighted round robin manner). In other embodiments, the Mcast_Macs_Remote table does not contain load balancing criteria. In these embodiments, the process 200 selects a service node tunnel in a load balanced manner by using other techniques (e.g., based on a hash of the data message header value and hash ranges associated with the service node tunnels).

At 230, the process forwards the BUM message to the selected service node by encapsulating the BUM message with a tunnel header of the selected service node's tunnel, and forwarding this encapsulated BUM message. When the BUM message is an ARP request, the process 200 receives (at 235) an ARP reply and processes this ARP reply by updating its Ucast_Macs_Remote table with the IP-to-MAC binding identified in the ARP reply. In some embodiments, the ARP reply typically is sent from the service node that received the ARP request at 230. However, in these embodiments, the ARP reply can come from other TORs 150, 152, or 154 as further described below. After 235, the process 200 ends.

Figure 3:
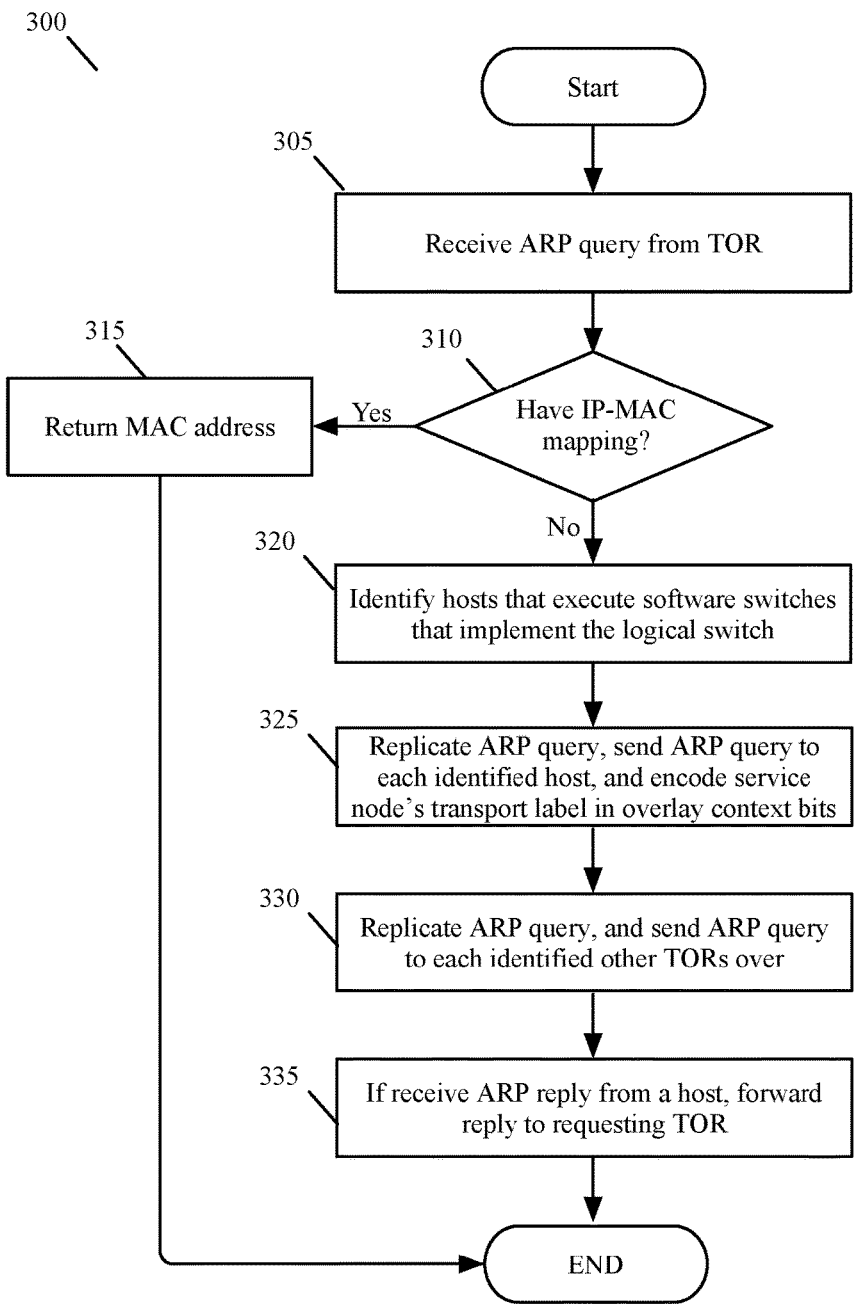
FIG. 3 illustrates a process that a service node performs in some embodiments to process an ARP request message that it receives from a TOR in the system.

FIG. 3 illustrates a process 300 that a service node performs in some embodiments to process an ARP request message that it receives from a TOR in the system 100. This process starts (at 305) each time the service node receives an ARP request message. The process 300 then determines (at 310) whether it stores a MAC address for the IP address that is identified in the ARP request. To do this, the process examines an IP-to-MAC binding table that it maintains by receiving records from the logical controllers 135 through the physical controllers 130, and by receiving IP-to-MAC bindings from hosts and TORs.

When the process 300 determines (at 310) that it has the MAC address associated with the IP address identified in the ARP request, the process returns (at 315) an ARP reply to provide the MAC address to requesting TOR (i.e., the TOR that sent the ARP request). In some embodiments, the process 300 sends the ARP reply to the requesting TOR through the same tunnel that the TOR used to send the ARP request. After 315, the process ends.

When the process 300 determines (at 310) that it does not have the MAC address associated with the IP address identified in the ARP request, the process identifies (at 320) the hosts that execute the software switches that implement the logical switch associated with the IP address in the received ARP request. At 325, the process then replicates the ARP query and sends this query to each identified host. When forwarding the ARP query to a host, the process 300 encodes its service node's transport label in the context bits that are encoded in the tunnel header of the tunnel between the service node and the host. This transport-label encoding enables the host to send back a unicast ARP response back to the service node.

Next, at 330, the process replicates the ARP query and sends this query to each other TOR (that implements the logical switch) over the tunnel that connects the service node to the TOR. When the target IP is attached to one of these other TORs, the TOR sends its ARP reply directly to the requesting TOR. As mentioned above, the service node interacts slightly differently with these other TORs when the ARP request is from a logical router port. This different interaction will be further described below by reference to FIG. 4. At 335, the process forwards any ARP reply that its gets from a host to the requesting TOR, and then ends. When the ARP reply is sent from a TOR to the requesting TOR, the process 300 would not send the ARP reply at 335 to the requesting TOR.

Figure 4:
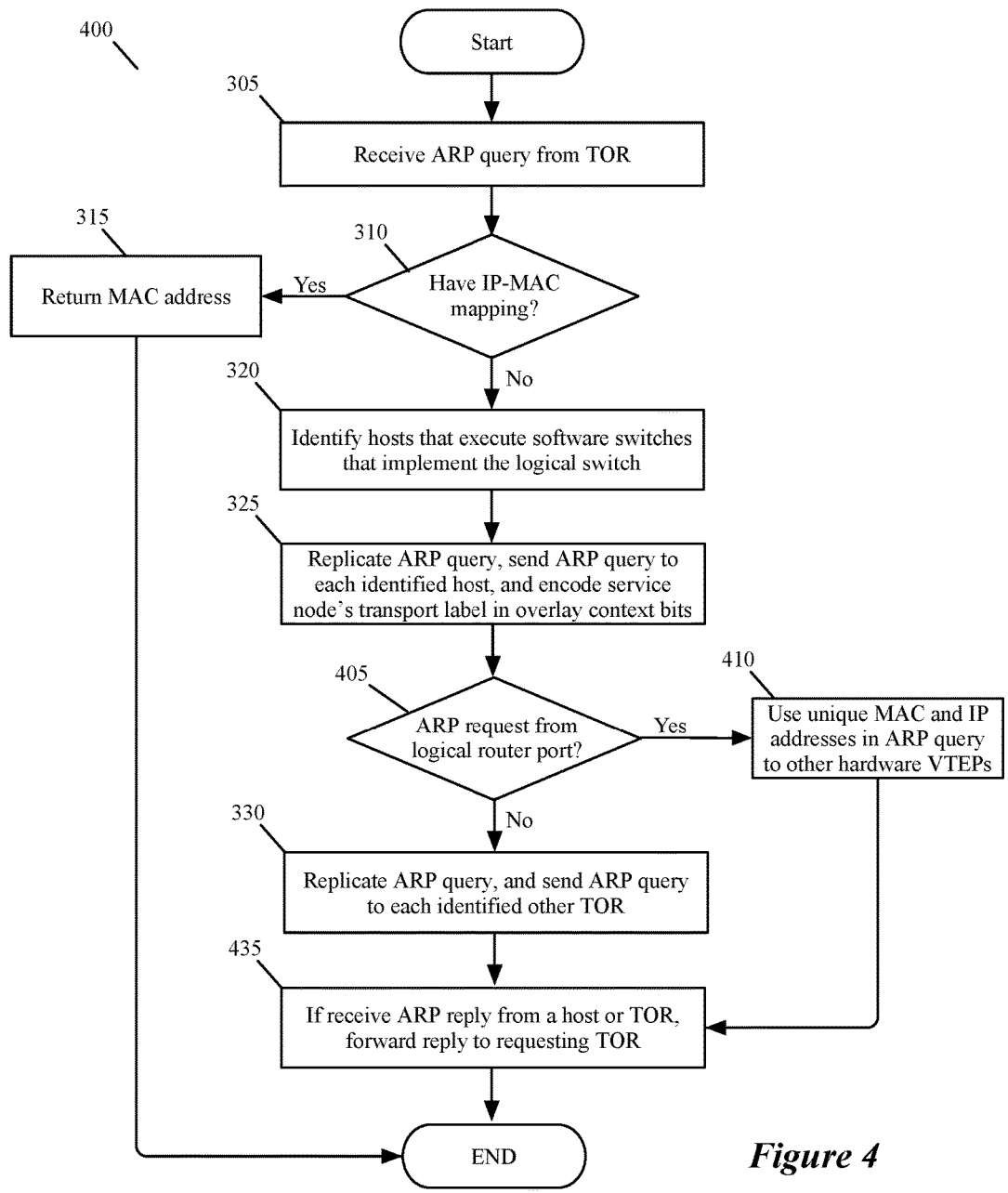
FIG. 4 illustrates a process that a service node performs in other embodiments to process an ARP request message that it receives from a TOR in the system.

FIG. 4 illustrates a process 400 that a service node performs in other embodiments to process an ARP request message that it receives from a TOR in the system 100. This process is similar to the process 300 except that it performs two additional operations 405 and 410, and performs operation 435 instead of 335.

After replicating and sending (at 325) the ARP request to the hosts, the process 400 determines (at 405) whether the ARP request is from a logical port. If not, it transitions to 330, which was described above. Otherwise, for each other TOR (i.e., each TOR other than the requesting TOR), the process replicates (at 410) the ARP request and inserts source IP of 0.0.0.0 and it service node's PMAC in the ARP request. The process then forwards (at 410) this ARP request to each other TOR. The insertion of the unique source IP and PMAC in the ARP request causes the TOR attached to the targeted IP to treat the ARP query as a probe that should be responded to by sending back the MAC address of the attached target IP to the service node. As mentioned above, the logical controller in some embodiments configures this TOR's table with an entry for PMAC pointing to the tunnel IP of the service node that sent the ARP query. At 435, the process forwards any ARP reply that its gets from a host or from a TOR (in cases where the ARP request is from a logical router port) to the requesting TOR. After 435, the process 400 ends.

Figure 5:
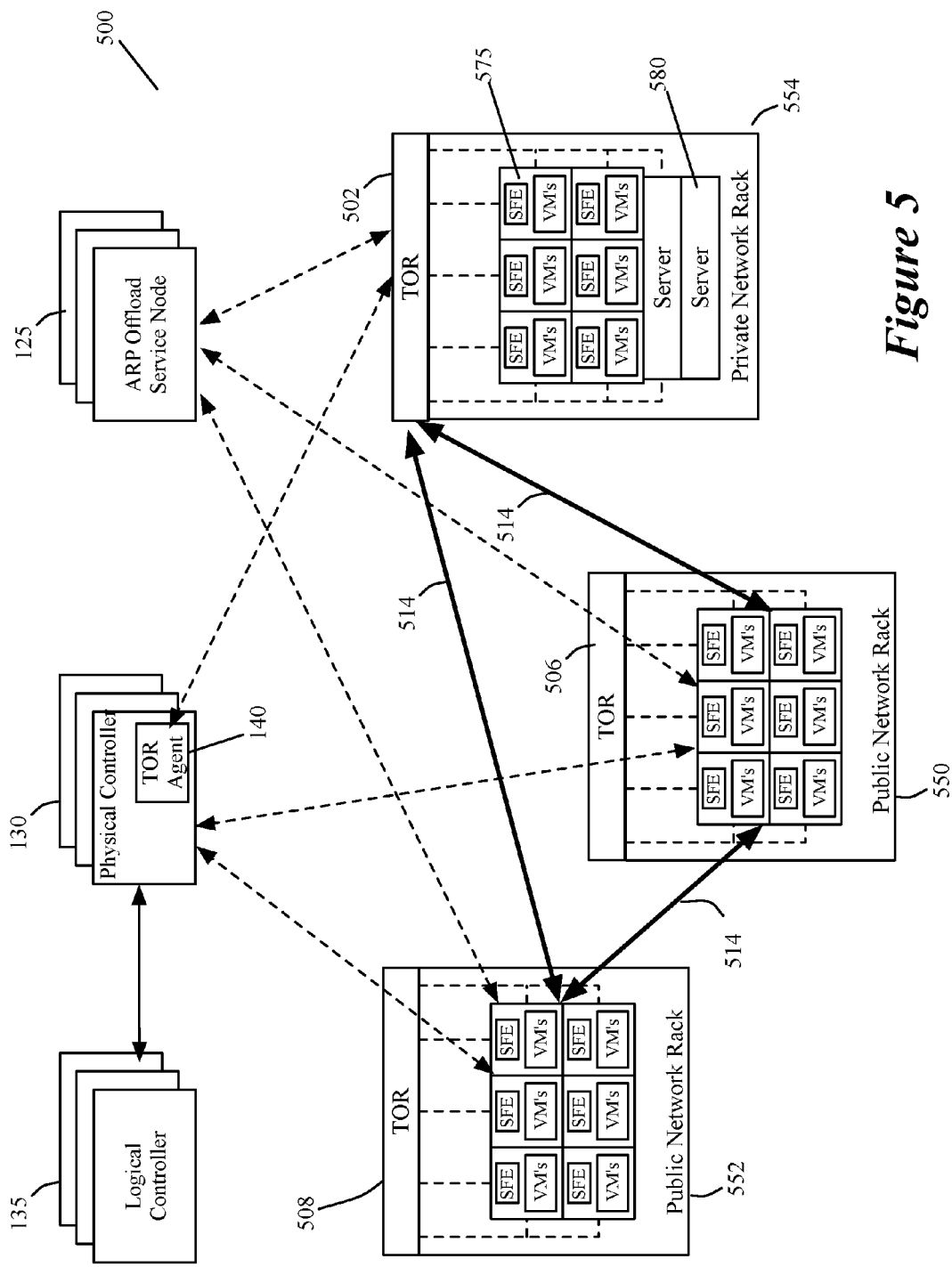
FIG. 5 illustrates another system that utilizes ARP offload service nodes of some embodiments.

FIG. 5 illustrates another system 500 that utilizes ARP offload service nodes 125 of some embodiments. The system 500 of this figure is similar to the system 100 of FIG. 1, except for a few differences. FIG. 5 shows one private network rack 554 and two public network racks 550 and 552. This figure also shows just one TOR for each rack (although two or more TORs might be used for each of one or more racks). The private network rack 554 is shown with several host computers 575 (with SFEs and VMs) as well as several standalone servers 580. Also, in some embodiments, the private and public network compute nodes can reside in the same datacenter (i.e., same physical location), or they can reside in different datacenters (i.e., in different locations).

FIG. 5 also shows three sets of tunnels 514, with each set being between two racks and having several tunnels that connect several tunnel endpoints on one rack (e.g., rack 552) to several tunnel endpoints on another rack (e.g., rack 550) or to the TOR 502. Each set of tunnels connects SFEs on one rack (e.g., rack 552) with SFEs on another rack (e.g., rack 550) or with TOR 502. More specifically, in some embodiments, the host computers in the same public network rack or in two different public network racks can connect to one another through tunnels 514 that allow the managed forwarding elements to define LFEs of the logical networks as logical overlay forwarding elements.

The tunnel headers in some embodiments include logical network identifiers (e.g., VNIs) that are needed to uniquely identify the LFEs. Different types of tunnels can be used in different embodiments. Examples of such tunnels include STT (stateless transport tunnels), GRE (Generic Routing Encapsulation) tunnels, VXLAN tunnels, Geneve tunnels, etc. Tunnels can often be viewed as point-to-point logical wire connections between their endpoints (e.g., between a host and a TOR, or between two hosts) because messages inside the tunnel headers are transparent to the intervening network fabric (e.g., intervening switches, routers, etc.).

The TOR 502 also connects to the SFEs of the host computers in the public network racks 550 and 552 through multiple logical overlay tunnels 514 for carrying the logical network identifiers for the logical network and for isolating the logical network data messages from intervening public network fabric (e.g., from TORs 506 and 508 on the racks 550 and 552). Accordingly, through the tunnels 514, the SFEs and TOR 502 implement LFEs (e.g., logical switches). In some embodiments, these LFEs do not span to the SFEs on private network rack 554, because these SFEs are part of the private network. The hosts of these SFEs operate behind the TOR 502, which terminates the LFEs in some embodiments.

FIG. 5 also shows the ARP service nodes 125 communicating with TOR 502 and the SFEs on racks 550 and 552, in order to exchange the ARP messaging described above by reference to FIGS. 2-4. It also shows the physical controllers 130 configuring the SFEs of the public network racks 550 and 552 to implement the LFEs, while a TOR agent 140 of these controllers 130 configure the TOR 502 to implement the LFEs. The TORs 506 and 508 of the public network racks 550 and 552 are not configured to implement the LFEs as these two TORs act as intervening network fabric that is transparent to the overlay logical network's LFEs.

As mentioned above, the TOR switch 502 implements one or more LFEs (with the SFEs of the public network racks 550 and 552) that connect the servers in the private network (i.e., in the rack 554) to the VMs in the public network. In this manner, the TOR switch 502 communicatively couples VMs that execute on host computers in a shared public racks 550 and 552, with standalone or virtualized servers in the private rack 554. The LFEs for the different logical networks isolate the data message communication of the different sets of VMs from each other, in order to allow the different sets of VMs for different logical networks to operate securely on the same and/or different hosts. Also, by incorporating this TOR 502 into a logical network (e.g., into a logical switch for a logical network), the data messages from the VMs of the logical network can be directed to the ports of the TOR 502 for forwarding to data compute nodes (DCNs, such as VMs and servers) in the private network rack 554.

In some embodiments, the logical controllers 135 generate data to define the logical forwarding elements, while the physical controllers distribute the generated data to the TOR 502 and the SFEs of the public network racks 550 and 552. The number of logical controllers can be different than the number of logical networks as one logical controller can generate data for multiple logical networks. The generated data is used to configure the SFEs of the public network racks 550 and 552 and of the private network rack's TOR 502 to implement the logical forwarding elements. In some embodiments, the generated data is transformed into physical data by the physical controllers 530, local controllers (not shown) executing on the hosts, and/or by a module operating on the TOR 502, before this data is supplied to the forwarding plane of the SFEs and/or TOR 502. For instance, before distributing the data generated by the logical controller, a physical controller in some embodiments converts the data into another format, e.g., into (1) physical control plane data for the TOR 502 and/or SFEs, or (2) into a format that a TOR module or host local controller can further process to produce physical control plane data. The number of physical controllers can be different than the number of managed TORs or SFEs as one physical controller typically distributes data to multiple managed TORs or SFEs.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
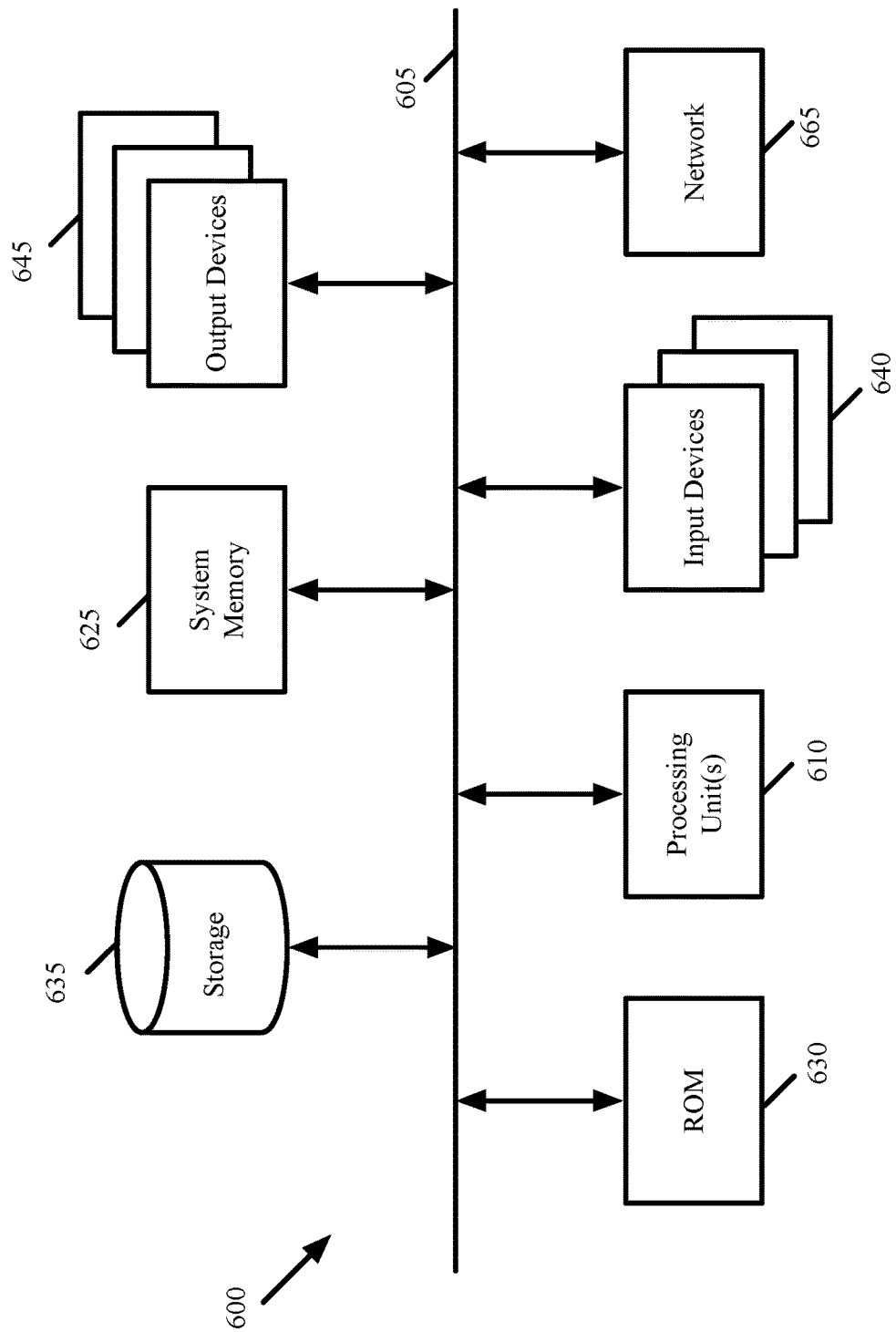
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, and managers. As such, it can be used to execute any of the above-described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. This specification refers throughout to computational and network environments that include virtual machines (VMs). However, virtual machines are merely one example of a compute node, also referred to as addressable nodes. Some embodiments of the invention are equally applicable to any computing node that utilizes a port abstraction defined on a host computing device to allow multiple programs that execute on the host to share common resources on the host. As such, the compute nodes in some embodiments may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc. Thus, one of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

Also, in the above description, ARP messages are described for obtaining MAC addresses of network nodes for a given IP address. However, one of ordinary skill will realize that ARP messages can be used to obtain any layer 2 address (link layer address) of any network node associated with a layer 3 address (network address). As used in this document, references to layer 2, layer 3, layer 4, and layer 7 (or L2, L3, L4, and L7 layers) are references respectively to the second data link layer, the third network layer, the fourth transport layer, and the seventh application layer of the OSI (Open System Interconnection) layer model. Also, as used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc.

In the above description, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A non-transitory machine readable medium storing a service node program for processing address resolution protocol (ARP) in a network comprising a plurality of managed software forwarding elements (MSFE) and at least one managed hardware forwarding element (MHFE), the program comprising sets of instructions for:
at a service node,
receiving an ARP request from the MHFE;
determining whether a layer 2 (L2) address for replying to the ARP request is stored locally at the service node;
when the L2 address is not stored locally, replicating the ARP request and sending the replicated ARP request to a set of MSFEs;
providing the L2 address to the MHFE when the L2 address is stored locally or when the L2 address is received from one of the MSFEs.

2. The non-transitory machine readable medium of claim 1, wherein the MHFE and the set of MSFEs implement at least one logical forwarding element (LFE), wherein the ARP request received at the service node relates to the LFE, wherein the program further comprising a set of instructions for identifying the LFE associated with the ARP request and the set of MSFEs associated with the identified LFE before sending the ARP request to the set of MSFEs.

3. The non-transitory machine readable medium of claim 2, wherein the plurality of MSFEs implement a plurality of LFEs.

4. The non-transitory machine readable medium of claim 2, wherein the MHFE is a hardware VXLAN (virtual extensible local area network) tunnel end point.

5. The non-transitory machine readable medium of claim 2, wherein the program further comprising a set of instructions for receiving L3-to-L2 address mapping for various ports of the LFE before receiving the ARP request and storing the address mapping in a local storage, wherein the set of instructions for determining whether the L2 address is stored locally comprises a set of instructions for examining the local storage for a record that associates an L3 address in the received ARP request with an L2 address.

6. The non-transitory machine readable medium of claim 2, wherein the set of instructions for sending the replicated ARP request comprises sets of instructions for sending the replicated ARP request to at least one MSFE through a tunnel, and encoding a transport label of the service node in a set of overlay network context bits that is included in a tunnel header of the tunnel, said encoded transport label allowing the MSFE to identify the service node and send back the ARP response as a unicast message back to the ARP-offload service node.

7. The non-transitory machine readable medium of claim 1, wherein the MHFE is a first WIFE and the network further comprises a second MHFE, the program further comprising a set of instructions for sending the replicated ARP request to the second WIFE.

8. The non-transitory machine readable medium of claim 7, wherein the set of instructions for sending the replicated ARP request to the second MHFE comprises a set of instructions for sending the replicated ARP request to the second WIFE through an overlay tunnel between the service node and the second MHFE, said second MHFE sending a reply to the ARP request to the first MHFE to provide the L2 address of a network node connected to the second MHFE when a network node with the L3 address identified in the ARP request is connected to the second MHFE.

9. The non-transitory machine readable medium of claim 7, wherein the program further comprises a set of instructions for changing, when the first MHFE is a logical router, a source layers 2 and 3 addresses in the replicated ARP request to pre-configured addresses in order to convert the ARP query to a probe that causes the second MHFE to send back the ARP reply to the service node based on configuration data provided to the second MHFE that specifies that the second MHFE should forward ARP requests with pre-configured L2 and L3 addresses back to the service node along a tunnel between the service node and second MHFE.

10. A method of processing address resolution protocol (ARP) in a network comprising a plurality of managed software forwarding elements (MSFE) and at least one managed hardware forwarding element (WIFE), the method comprising:
at a service node,
receiving an ARP request from the MHFE;
determining whether a layer 2 (L2) address for replying to the ARP request is stored locally at the service node;
when the L2 address is not stored locally, replicating the ARP request and sending the replicated ARP request to a set of MSFEs;
providing the L2 address to the MHFE when the L2 address is stored locally or when the L2 address is received from one of the MSFEs.

11. The method of claim 10, wherein the MHFE and the set of MSFEs implement at least one logical forwarding element (LFE), wherein the ARP request received at the service node relates to the LFE, wherein the method further comprising identifying the LFE associated with the ARP request and the set of MSFEs associated with the identified LFE before sending the ARP request to the set of MSFEs.

12. The method of claim 11, wherein the plurality of MSFEs implement a plurality of LFEs.

13. The method of claim 11, wherein the MHFE is a hardware VXLAN (virtual extensible local area network) tunnel end point.

14. The method of claim 11 further comprising receiving L3-to-L2 address mapping for various ports of the LFE before receiving the ARP request and storing the address mapping in a local storage, wherein determining whether the L2 address is stored locally comprises examining the local storage for a record that associates an L3 address in the received ARP request with an L2 address.

15. The method of claim 11, wherein sending the replicated ARP request comprises sending the replicated ARP request to at least one MSFE through a tunnel, and encoding a transport label of the service node in a set of overlay network context bits that is included in a tunnel header of the tunnel, said encoded transport label allowing the MSFE to identify the service node and send back the ARP response as a unicast message back to the ARP-offload service node.

16. The method of claim 10, wherein the MHFE is a first MHFE and the network further comprises a second MHFE, the method further comprising sending the replicated ARP request to the second MHFE.

17. The method of claim 16, wherein sending the replicated ARP request to the second WIFE comprises sending the replicated ARP request to the second WIFE through an overlay tunnel between the service node and the second MHFE, said second WIFE sending a reply to the ARP request to the first MHFE to provide the L2 address of a network node connected to the second MHFE when a network node with the L3 address identified in the ARP request is connected to the second MHFE.

18. The method of claim 16 further comprising:
when the first MHFE is a logical router, changing a source layers 2 and 3 addresses in the replicated ARP request to pre-configured addresses in order to convert the ARP query to a probe that causes the second MHFE to send back the ARP reply to the service node because configuration data provided to the second WIFE that specifies that the second MHFE should forward ARP requests with pre-configured L2 and L3 addresses back to the service node along a tunnel between the service node and second MHFE.

* * * * *